United States Patent [19]

Balzer

[11] Patent Number: 4,537,102
[45] Date of Patent: Aug. 27, 1985

[54] METHOD OF SHEARING METAL BILLETS

[75] Inventor: Norbert R. Balzer, Boaz, Ala.

[73] Assignee: Park-Ohio Industries, Inc., Shaker Heights, Ohio

[21] Appl. No.: 463,592

[22] Filed: Feb. 3, 1983

[51] Int. Cl.³ .............................................. B26D 7/10
[52] U.S. Cl. ......................................... 83/16; 83/168; 83/170; 83/282; 83/694
[58] Field of Search ...................... 83/16, 170, 15, 171, 83/168, 212.1, 282, 694; 72/342; 219/156, 10.71, 10.69

[56] References Cited

U.S. PATENT DOCUMENTS 4,219,727  8/1980  Bolt ............................................ 83/16
4,343,209  8/1982  Moelbert .................................. 83/16

FOREIGN PATENT DOCUMENTS 148783   12/1978  Japan ........................................ 83/16
132913    8/1982  Japan ...................................... 83/170
1407232   9/1975  United Kingdom ................... 83/170

Primary Examiner—James M. Meister
Assistant Examiner—John L. Knoble
Attorney, Agent, or Firm—Body, Vickers & Daniels

[57] ABSTRACT

A method of hot-shearing an elongated metal bar into sections of given gauge length comprises longitudinally indexing the metal bar to position cross-sectional zones thereof where it is to be sheared successively at a plurality of heating stations at which the shear zones of the bar are progressively heated by resistance heating units to reduce the force required for subsequent shearing of the bar through the heated shear zones on ensuing index thereof to a shearing station.

10 Claims, 3 Drawing Figures

METHOD OF SHEARING METAL BILLETS

BACKGROUND OF THE INVENTION

This invention relates to a method of shearing metal bar stock into sections of predetermined gauge length and, more particularly, to such a shearing method wherein the metal bar is in a heated condition at its shearing zones when sheared.

It is well known that, in the shearing of elongated metal billets or bars into sections of given gauge length, the amount of force required to shear the bar is substantially reduced and the shear quality markedly improved if the bars are sheared while in a heated condition throughout their cross-sectional shear zones. To heat metal bars of comparatively large cross-sectional size, however, the time normally required to heat such large size metal bars throughout their cross-section by the conventional heating means heretofore employed for such purpose, such as radiant furnaces or induction heating, is too long to meet the operating capabilities of the shear mechanism and thus slows down the operation of shearing the metal bar into sections of shorter length.

SUMMARY OF THE INVENTION

The present invention contemplates a new and improved method of shearing elongated metal billets or bars into individual gauge lengths through heated shear line zones of the bar, which method overcomes all of the above-mentioned problems and others and affords a higher production rate than prior such shearing methods.

Briefly stated, in accordance with one aspect of the invention, the elongated metal bars which are to be sheared into individual gauge lengths are each intermittently indexed longitudinally, through successive distances corresponding to the gauge length of the sections to be sheared therefrom, to position each of the shear line zones of the metal bar successively at a plurality of heating stations where they are progressively heated through their cross-sectional extent to an elevated shearing temperature by electrical resistance heating units located at such heating stations. During the dwell of the shear line zones at each of the heating stations, the electrical contacts of the resistance heating units are moved into electrical contact with the shear line zones of the bar and the heating units then electrically energized to effect the direct resistance heating of the bar. By thus progressively heating the shear line zones of the metal bar by direct electrical resistance heating thereof at a plurality of successive heating stations, the heating time required for heating these shear line zones to an elevated shearing temperature then is appreciably reduced, particularly in the case of metal bars of comparatively large cross-sectional size, over that required with prior art heating methods and thus can be brought into more or less timewise compatibility with the operating time capabilities of the bar shearing mechanism itself. As a result, markedly higher production rates are possible.

In accordance with a further aspect of the invention, those portions of the surface area of the metal bar at the shearing zones thereof which are to be contacted by the electrical contacts of the resistance heating units at the heating stations preferably are effectively cleaned off, during the dwell period of the intermittently indexed metal bar, prior to the positioning of each of the shear line zones of the bar at the first one of the heating stations, in order to thereby assure a good electrical contact of these surface area portions with the electrical contacts of the resistance heating units at the heating stations. For this same purpose also, the electrical contacts of the electrical resistance heating units at each of the heating stations are preferably periodically cleaned off while they are disengaged from the metal bar during the index movements thereof.

The principal object of the invention is to provide a novel method of hot-shearing elongated metal bars into individual bar sections of determinate gauge length which minimizes the time required to heat the bar to an elevated shearing temperature through the shear zones thereof.

Another object of the invention is to provide a method of hot-shearing elongated metal bars into individual gauge lengths which affords a higher production rate then heretofore.

Still another object of the invention is to provide a method of hot-shearing elongated metal bars into individual gauge lengths which affords a materially higher production rate particularly in the case of bars of comparatively large cross-section.

A further object of the invention is to provide a method of hot-shearing elongated metal bars into individual gauge lengths wherein the heating of the bar is confined mainly to the shear line zones thereof.

A still further object of the invention is to provide a method of hot shearing elongated metal bars into individual gauge lengths which entails a materially lower power consumption than that required in prior known methods.

Further objects and advantages of the invention will appear from the following detailed description of a preferred species thereof and from the accompanying drawings.

BRIEF DESCRIPTION OF THE DRAWINGS

Figure 1:
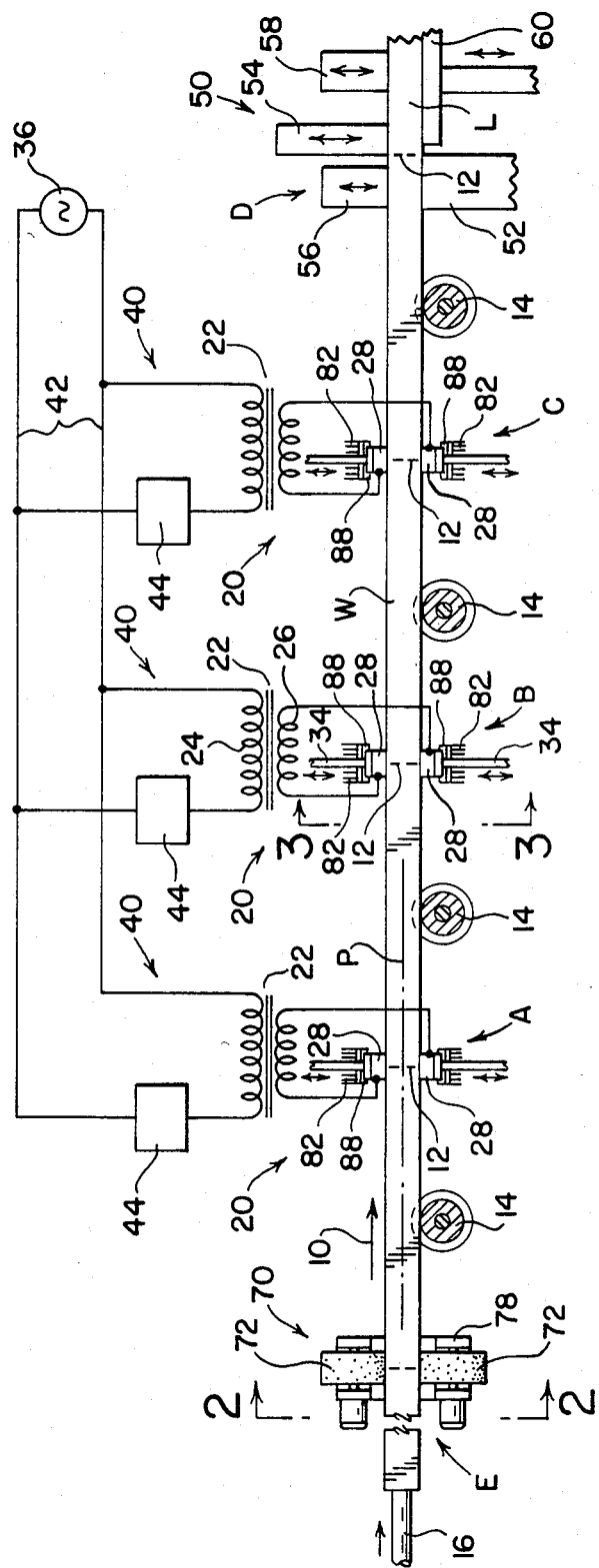
Figure 2:
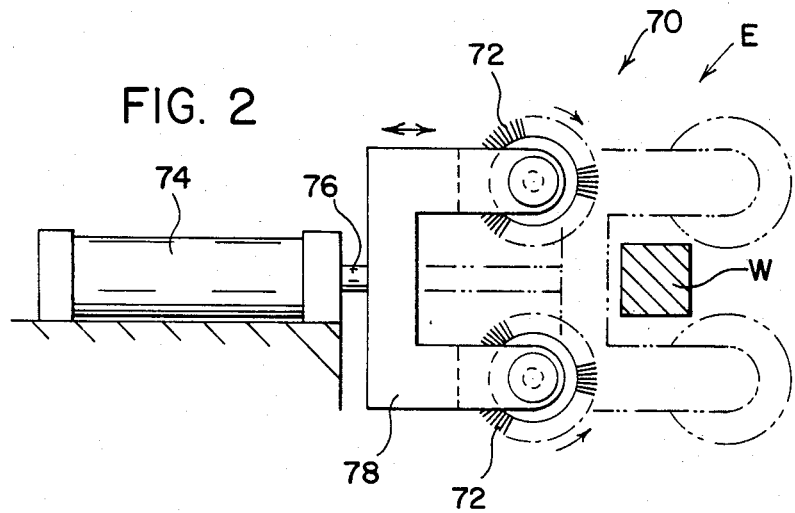
Figure 3:
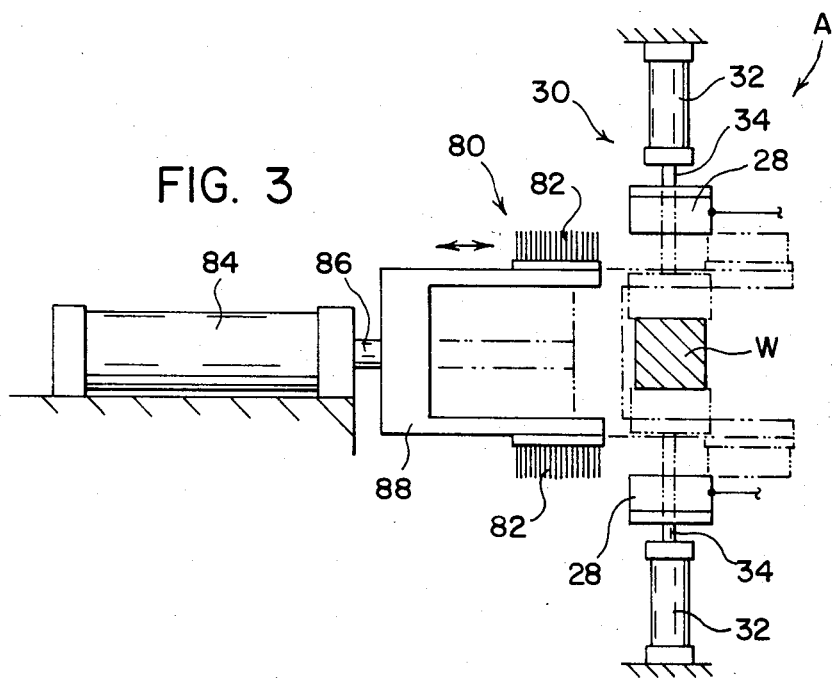

IN THE DRAWINGS:

FIG. 1 is a schematic side elevational view of a representative apparatus for carrying out the method comprising the invention for hot-shearing of elongated metal bars into individual sections of determinate gauge length;

FIG. 2 is a sectional view on the line 2—2 of FIG. 1 showing a representative cleaner arrangement for cleaning off the surface area portions of the metal bars to be engaged by the electrical contacts of the resistance heating units for the metal bars; and, FIG. 3 is a sectional view on the line 3—3 of FIG. 1 showing a representative cleaner arrangement for cleaning off the electrical contacts of the resistance heater units for the metal bars while disengaged therefrom.

DESCRIPTION OF THE PREFERRED EMBODIMENTS

Referring now to the drawings wherein the showings are for the purpose of illustrating a preferred embodiment of the invention only and not for the purpose of limiting same, elongated metal bars or workpieces W to be hot-sheared into individual gauge lengths L are each intermittently indexed longitudinally along a horizontal feed path P, in the direction as indicated by the arrow 10, through successive distances corresponding to the gauge lengths of the sections L to be sheared from the bar, to stationarily position for a given dwell period each of a plurality of spaced shearline zones 12 of the bar successively at a plurality, preferably three, of heating stations such as shown at A, B and C. The shear line zones 12 of the bar W are each progressively heated at the successive heating stations A, B and C through the entire cross-sectional extent of the bar to raise the temperature of these zones 12 so as to reduce the force required to shear the bar thereat. From the last heating station C, each successive shear line zone 12 of the bar W is then advanced to and stationarily positioned, during the dwell period of the intermittently indexing bar, at a bar shearing station D where the foremost end length section L of the bar is then sheared therefrom through the thus positioned heated shear line zone 12 of the bar at this station D. Suitable support means such as a plurality of spaced rollers 14, support the bar W for the indexing movement thereof along the feed path P. The indexing feed movement of the bar W may be effected by any suitable feed mechanism such as, for example, an intermittently indexing push rod 16 actuated by a hydraulic cylinder (not shown) or other suitable actuating mechanism. The bar W may be of square, rectangular, round, or other cross-sectional contour.

In accordance with the invention, the heating of the metal bar W for hot-shearing thereof, rather than being performed by radiant furnaces or by induction heating of the bar as customary heretofore, is produced instead by direct electrical resistance heating of the bar W through the shear line zones 12 thereof during their dwell at each of the heating sections A, B and C. The electrical resistance heating of the metal bar W is produced by appropriate electrical resistance heating units 20 respectively located at each of the heating stations A, B and C and which, during the dwell period of the shear line zones 12 of the bar W at each of these heating stations, electrically contact with the opposite sides of the bar W across the shear line zones 12 to complete an electrical resistance series heating circuit therethrough. On energization of the resistance heating units during such dwell period, the cross-sectional area of the bar W between the contacts is heated. Preferably, this is done by a low frequency power supply 36, i.e., less than about 1000 Hertz.

As schematically illustrated in the drawings, each of the electrical resistance heating units 20 may comprise, for example, a transformer 22 including a primary coil 24, and a secondary coil 26 connected at its opposite ends to a pair of electrical contacts 28 which are mounted on opposite sides of the intermittently indexed metal bar W for reciprocation into and out of engagement and electrical contact with the opposite sides of the bar during each dwell period thereof. The electrical contacts 28 may be comprised of copper pads of sufficient surface contact area to provide a good electrical contact with the metal bar W preferably across the full width thereof, to prevent arcing or spot-welding at the current densities contemplated for the resistance heating of the bar through the shear lines zones 12 thereof. Suitable actuating mechanism 30 (FIG. 3) is provided at each of the heating stations A, B and C for reciprocating the electrical contacts 28 into and out of electrical contact with the bar W during the dwell of each of the shear line zones 12 thereof at each heating station. The actuating mechanism 30 may comprise, for instance, respective pairs of hydraulic cylinders 32 located at the respective heating stations A, B and C and having their piston rods 34 suitably connected by an insulative connection to the electrical contacts 28 of the respective heating units to forcefully press them against and hold them in good electrical contact with the opposite sides of the bar W, across substantially the full surface extent thereof at the shear line zones 12, during the dwell of the latter at each of the heating stations.

The electrical resistance heating units 20 are intermittently electrically energized from a common AC power supply 36 of low frequency, e.g. less than about 1000 Hertz, during each dwell period of the intermittently indexed bar W, through respective control circuits 40 which are connected to the leads 42 from the power supply 36 and which may each include, for instance, a solid state triggering circuit and current control switches, usually silicon controlled rectifiers or SCR's as denoted schematically at 44. The primary coils 24 of the transformers 22 are electrically connected in respective ones of the control circuits 40 therefor so as to be electrically energized when the control circuits are actuated. To avoid electrical arcing between the electrical contacts 28 of the heating units 20 and the metal bar W, or spot welding of these contacts to the bar, the control circuits 40 of the heating units 20 preferably are arranged so as to electrically energize the transformers 22 and the electrical contacts 28, during each dwell period of the bar, only after the contacts are first engaged with and then before they are subsequently disengaged from the metal bar W.

The degree of resistance heating of the bar W through the shear line zones 12 thereof by the resistance heating units 20 at each of the heating stations A, B and C is controlled, by the appropriate setting of the triggering circuit and control switches 44 of the control circuit 40 for each resistance heating unit 20, so that only a portion of the total desired heating of the shear line zones 12 by all the heating units 20 in toto, occurs at each of the heating stations. Preferably, the heating units 20 are set so that a proportionate or equivalent degree of the total desired heating of the shear line zones 12, by all the heating units 20 in toto, is effected at each heating station. Thus, where three heating units 20 are employed, as in the particular case illustrated, to progressively heat the shear line zones 12 of the bar W to a given final temperature for shearing of the bar therethrough, the heating units 20 in such case are preferably set so as to effect at each heating station approximately one-third of the total degree of heating of the shear line zones 12 by all the heating units 20 in toto.

Following the index of each finally heated shear line zone 12 of the bar W from the last heating station C to, and during the dwell thereof at the bar shearing station D, the bar is then sheared through the heated shear line zone 12 at such station D by a conventional type bar shearing mechanism 50 located thereat so as to form a sheared-off bar gauge length L. As schematically illustrated in FIG. 1, the shearing mechanism 50 may comprise, for example, a stationary shear blade or bed knife 52 on which the bar W rests, and a cooperating reciprocally movable shear blade or knife 54 which coacts with the stationary shear blade 52 in a shearing action to forcibly shear transversely through the bar W at the heated shear line zone 12 thereof to shear off the gauge length L from the bar. Because of the heated condition of the bar W through the sheared line zone 12 thereof, a shear of good quality is then formed as compared to that formed when the bar is in an unheated condition. To further aid in forming a shear of good quality, the shearing mechanism 50 may include a reciprocable bar hold-down 56 for clamping the bar W firmly in place against the stationary shear blade 52 during the shearing operation, as well as a reciprocable second hold-down 58 for holding or clamping the gauge length L of the bar W to be sheared off firmly down against a reciprocable rest or support member 60 on which the foremost end or gauge length portion L of the bar to be sheared off is supported during the shearing operation. On completion of each shearing operation, the sheared-off gauge lengths L are suitably removed from the support member 60 and stored.

The conventional type shearing mechanisms 50 commonly employed for the hot-shearing of metal billets or bars W ordinarily have an operating cycle time, e.g., around 1.1 second or thereabouts, which is considerably shorter than the time normally required to heat the bars to the desired shearing temperatures by radiant furnace or induction heating methods such as employed heretofore. However, with the direct electrical resistance heating method according to the invention wherein localized shear line zones 12 only of the metal bars W are progressively heated to a given shearing temperature at a plurality of successive heating stations, the time required to heat the metal bar at each of the multiple heating stations can be made to more or less correspond to the normal operating cycle time of such conventional shearing mechanisms 50. As a result, a considerably higher production rate for the sheared gauge lengths L is realized as compared to that possible with prior hot-shearing methods employing radiant furnace or induction heating of the metal bars.

As an advantageous added step in carrying out the hot-shearing method according to the invention, the surfaces of the indexing metal bar W, at each of the shear line zones 12 thereof which are to be contacted by the movable contacts 28 of the resistance heating units 20, preferably are suitably cleaned off, at least prior to their positioning at the first heating station A, in order to thereby assure a good electrical contact of the contacts 28 with the metal bar at the shear line zones 12 thereof. Any suitable bar cleaning mechanism 70 may be employed for this purpose which will accomplish the desired cleaning of the contact-engaging surfaces of the intermittently indexing bar W, across each of the shear line zones 12 thereof, during at least their dwell at a bar cleaning station E located one or more gauge lengths L in advance of the first heating station. Thus, as schematically illustrated in FIG. 2, where the bar W is of square or rectangular cross-section as shown, the bar cleaning mechanism 70 may simply comprise, for example, a pair of stiff-wire electric motor powered rotary brushes 72 mounted for reciprocation back and forth across and in abrading engagement with the opposite flat side surfaces of the bar W, at the shear line zones 12 thereof, which are to be subsequently engaged by the contacts 28 of the resistance heating units 20 at the heating stations A, B and C. The power rotated brushes 72 may be suitably reciprocated across the bar W by a hydraulic cylinder 74 the piston 76 of which is connected to and reciprocates a suitable support frame 78 on which the brushes 72 are mounted. The hydraulic cylinder 74 is suitably actuated, during at least the dwell of each shear line zone 12 of the bar W at the bar cleaning station E, to effect the desired cleaning of the contact-engaging surfaces of the bar at such zones 12. It will be appreciated that the particular form of bar cleaning mechanism 70 employed will depend, in part, on the cross-sectional shape of the metal bar W being processed. For example, in the case of metal bars or rods W of round cross-section, rotary wire brushes 72 of corresponding arcuately curved form and intermittently engaged with and rotated lengthwise of the metal bar may be employed instead of the transversely reciprocated rotary brushes illustrated.

As a further advantageous step in carrying out the hot-shearing method according to the invention, the bar-contacting surfaces of the electrical contacts 28 of resistance heating units 20 preferably are also regularly cleaned off, during the course of the bar heating and shearing operation, to likewise assure a good electrical contact of these contact surfaces with the metal bar W at the shear line zones 12 thereof. The cleaning of the contacts 28 is desirably carried out at least prior to the index of the first shear line zone 12 of each bar W being processed to each respective heating station A, B and C, and preferably during the index of each bar shear line zone 12 to each of these heating stations. As in the case of the bar-cleaning mechanism 70, any suitable contact cleaning mechanism 80 may be employed for this particular purpose. Thus, as schematically illustrated in FIG. 3, where the metal bar W is of square or rectangular cross-section as shown and the electrical contacts 28 are of flat-surfaced form to engage flatwise with opposite flat sides of the metal bar, the contact cleaning mechanism 80 in such case may simply comprise a pair of flat stiff-wire brushes 82 mounted for reciprocation back and forth across and in abrading engagement with the flat bar-engaging contact surfaces of the contacts 28 while in their fully separated open or bar-disengaged position during the index movements of the bar W. The brushes 82 may be reciprocated by a hydraulic cylinder 84 the piston 86 of which is connected to and reciprocates a suitable support frame 88 on which the brushes 82 are mounted. The hydraulic cylinder 84 is suitably actuated, during the interval the electrical contacts 28 are in their retracted position disengaged from the metal bar W during each index movement thereof, to effect the desired cleaning of the bar-engaging surfaces of the electrical contacts at such time. It also will be appreciated that the particular form of contact cleaning mechanism 80 employed will depend in part on the cross-sectional shape of the metal bar W being processed and the matching bar-contacting surface of the electrical contacts 28. For instance, in the case where the bar-contacting surfaces of the contacts 28 are of arcuate shape to match the round cross-sectional contour of cylindrical or rod-shaped metal bars W, contact cleaning wire brushes 82 of corresponding arcuately curved form and suitably moved into engagement with and rotated lengthwise of the metal bar may be employed instead of the flat brushes illustrated.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described the invention, it is claimed:

1. The method of shearing sections of predetermined gauge length from an elongated metal bar comprising the steps of:

(a) intermittently indexing the elongated bar longitudinally along a horizontal linear feed path through successive distances, corresponding to the said gauge length, to position each one of a plurality of spaced shear line zones of the bar successively at a plurality of heating stations, and thence at a shearing station, for a predetermined length of dwell time at each of said stations;

(b) moving the electrical contacts of a plurality of respective electrical resistance heating units into operative position, at respective ones of said heating stations during the dwell time of each said shear line zone thereat, with the work surfaces of said contacts in continuous mating surface contacting engagement throughout with localized surface areas of said bar located at and immediately adjacent the said shear line zones and extending across substantially the full width of the opposite sides of the cross-section of the bar at the said shear line zones;

(c) energizing the said resistance heating units during the interval their said contacts are engaged with the said bar at said heating stations to thereby effect direct resistance heating of said bar approximately uniformly throughout substantially the full cross-sectional extent of the bar at each of said bar shear line zones to only a partial degree of the total heating of each of said shear line zones, by all said heating units in toto, for subsequent shearing of the bar through said shear line zones; and, (d) then successively shearing said bar through said heated bar shear line zones during their dwell at said shearing station.

2. The method as defined in claim 1 wherein the extent of heating of said bar shear line zones at each of said heating stations by the respective resistance heating units thereat is approximately of equivalent degree.

3. The method as defined in claim 1 wherein each of said bar shear line zones is successively indexed to and positioned at three said heating stations and is heated at each of said heating stations by the respective resistance heating units thereat to approximately the same extent each amounting to approximately one-third of the cumulative heating thereof by all the said heating units in toto.

4. The method of shearing sections of predetermined gauge length from an elongated metal bar comprising the steps of:

(a) intermittently indexing the elongated bar longitudinally along a horizontal linear feed path through successive distances, corresponding to the said gauge length, to position each one of a plurality of spaced shear line zones of the bar successively at a plurality of heating sections, and thence at a shearing station, for a predetermined length of dwell time at each of said stations;

(b) moving the electrical contacts of a plurality of respective electrical resistance heating units into engagement with opposite sides of said bar at respective ones of said heating stations during the dwell time of each said shear line zone of the bar thereat;

(c) energizing the said resistance heating units during the interval their said contacts are engaged with the said bar at said heating stations to thereby effect direct resistance heating of said bar through each of said bar shear line zones only to a partial degree of the total heating thereof, by all said heating units in toto, for subsequent shearing of the bar through said shear line zones; and (d) then successively shearing said bar through said heated bar shear line zones during their dwell at said shearing station; said method including the additional step of cleaning those portions of the surface area of said indexing bar to be contacted by the said contacts of said resistance heating units, at least immediately prior to the positioning of each of said bar shear line zones at the initial one of said heating stations.

5. The method as defined in claim 4 including the additional step of periodically cleaning the said contacts of said resistance heating units while disengaged from the said metal bar during the index movements thereof to position the said shear line zones of the bar at said heating stations.

6. The method as defined in claim 5 wherein the said cleaning of the said contacts of said resistance heating units is carried out during each index movement of the metal bar.

7. The method of shearing sections of predetermined gauge length from an elongated metal bar comprising the steps of:

(a) intermittently indexing the elongated bar longitudinally along a horizontal linear feed path through successive distances, corresponding to the said gauge length, to position each one of a plurality of spaced shear line zones of the bar successively at a plurality of heating stations, and thence at a shearing station, for a predetermined length of dwell time at each of said stations;

(b) moving the electrical contacts of a plurality of respective electrical resistance heating units into engagement with opposite sides of said bar at respective ones of said heating stations during the dwell time of each said shear line zone of the bar thereat;

(c) energizing the said resistance heating units during the interval their said contacts are engaged with the said bar at said heating stations to thereby effect direct resistance heating of said bar through each of said bar shear line zones only to a partial degree of the total heating thereof, by all said heating units in toto, for subsequent shearing of the bar through said shear line zones; and (d) then successively shearing said bar through said heated bar shear line zones during their dwell at said shearing station; said method including the additional step of periodically cleaning the bar-engaging surface areas of the said contacts of said resistance heating units while disengaged from the said metal bar during the index movements thereof to position the said shear line zones of the bar at said heating stations.

8. The method as defined in claim 7 wherein the said cleaning of the said contacts of said resistance heating units is carried out during each index movement of the metal bar.

9. The method of shearing sections of predetermined gauge length from an elongated metal bar comprising the steps of:

(a) intermittently indexing the elongated bar longitudinally along a horizontal linear feed path through successive distances, corresponding to the said gauge length, to position each one of a plurality of spaced shear line zones of the bar successively at a plurality of heating stations, and thence at a shearing station, for a predetermined length of dwell time at each of said stations;

(b) providing a plurality of electrical resistance heating units having respective pairs of electrical contacts located at respective ones of said heating stations and on opposite sides of the said feed path and movable into electrical contacting engagement with opposite sides of said bar, the bar contacting work surfaces of said contacts having a profile matching that of the said opposite sides of the bar;

(c) moving the said electrical contacts into matching electrical contacting engagement with said bar, during the dwell time of each of said bar shear line zones at the said heating stations, to position their said work surfaces in continuous mating surface contacting engagement throughout with localized surface areas of the said opposite sides of the bar at and immediately adjacent the said shear line zones and extending across substantially the full width of the opposite sides of the cross-section of the bar at the said shear line zones;

(d) energizing the said resistance heating units during the interval their said contacts are engaged with the said bar at said heating stations to thereby effect direct resistance heating of said bar approximately uniformly throughout substantially the full cross-sectional extent of the bar at and immediately adjacent each of said bar shear line zones to only a partial degree of the total heating of each of said shear line zones, by all said heating units in toto, for subsequent shearing of the bar through said shear line zones; and, (e) then successively shearing said bar through said heated bar shear line zones during their dwell at said shearing station.

10. The method as defined in claim 9, wherein the extent of heating of said bar shear line zones at each of said heating stations by the respective resistance heating units thereat is approximately of equivalent degree.

* * * * *